(12) United States Patent
Gong (10) Patent No.: US 9,231,472 B2
(45) Date of Patent: Jan. 5, 2016

(54) SYSTEM AND METHOD FOR A SWITCHED-MODE POWER SUPPLY

(71) Applicant: Infineon Technologies Austria AG, Villach (AT)

(72) Inventor: Xiao Wu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/251,066

(22) Filed: Apr. 11, 2014

(65) Prior Publication Data

US 2015/0295494 A1 Oct. 15, 2015

(51) Int. Cl.
| H05B 37/02 | (2006.01) |
| H05B 39/04 | (2006.01) |
| H05B 41/36 | (2006.01) |
| H02M 3/158 | (2006.01) |
| H05B 33/08 | (2006.01) |
| H02M 1/08 | (2006.01) |
| H02M 1/36 | (2007.01) |
| H05B 41/392 | (2006.01) |
| H05B 41/282 | (2006.01) |
| H02M 1/00 | (2007.01) |

(52) U.S. Cl.
CPC .............. *H02M 3/158* (2013.01); *H02M 1/08* (2013.01); *H02M 1/36* (2013.01); *H05B 33/0815* (2013.01); *H05B 41/2828* (2013.01); *H05B 41/3925* (2013.01); *H02M 2001/0009* (2013.01)

(58) Field of Classification Search
CPC ..... H02M 3/156; H02M 3/157; H02M 1/088; H02M 2001/0009; H02M 2001/0032; G01R 19/25; Y10T 307/406; H05B 33/0815; H05B 33/086; H05B 33/0827; H05B 33/0824; H05B 33/0812; H05B 33/0887; H05B 33/089
See application file for complete search history.

(56) References Cited

U.S. PATENT DOCUMENTS

| 8,941,404 | B2 * | 1/2015 | Bernardon | ............... 324/764.01 |
| 2012/0078556 | A1 * | 3/2012 | Holmberg et al. | ............... 702/64 |
| 2012/0098553 | A1 * | 4/2012 | Karlsson et al. | ............... 324/684 |
| 2012/0182003 | A1 * | 7/2012 | Flaibani et al. | ............... 323/284 |
| 2012/0182049 | A1 * | 7/2012 | Garbossa et al. | ............... 327/109 |
| 2013/0134985 | A1 * | 5/2013 | Bernardon | ............... 324/527 |
| 2014/0268918 | A1 | 9/2014 | Gong | |

OTHER PUBLICATIONS

Renesas, "R2A20135SP," Application Note, R19AN0011EJ0200, Rev.2.00, Jul. 24, 2013, 11 pgs.

* cited by examiner

*Primary Examiner* — Vibol Tan
(74) *Attorney, Agent, or Firm* — Slater & Matsil, L.L.P.

(57) ABSTRACT

In accordance with an embodiment, a method of operating a switched-mode power supply includes receiving power from an input node via a first transistor, providing a first portion of the received power to a load via a switching transistor having a first terminal coupled to the first transistor and a second terminal coupled to the load via a series resistor and a series inductor, measuring a current through the load, measuring comprising monitoring a voltage across the series resistor; and controlling an average current through the load by switching on and switching off the switching transistor according to the measured current.

27 Claims, 4 Drawing Sheets

Adj = 1 → Decrease delay
Adj = 0 → Increase delay

SYSTEM AND METHOD FOR A SWITCHED-MODE POWER SUPPLY

TECHNICAL FIELD

The present disclosure relates generally to an electronic device, and more particularly to a system and method for a switched mode power supply.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

A SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

One application of an SMPS is as a power supply for a light emitting diode (LED), such as those used in residential and commercial lighting applications to replace incandescent light bulbs and compact florescent lamps (CFL). In some applications, a SMPS is used to convert an AC line voltage to a DC current in order to power the LED.

SUMMARY OF THE INVENTION

In accordance with an embodiment, a method of operating a switched-mode power supply includes receiving power from an input node via a first transistor, providing a first portion of the received power to a load via a switching transistor having a first terminal coupled to the first transistor and a second terminal coupled to the load via a series resistor and a series inductor, measuring a current through the load, measuring comprising monitoring a voltage across the series resistor; and controlling an average current through the load by switching on and switching off the switching transistor according to the measured current.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a switched-mode power supply in a buck converter configuration. Embodiments of the present invention may also be applied to other switched-mode power supply configurations and other systems and applications including other circuits that switch including, but not limited to power systems and motor control systems.

In an embodiment of the present invention, a buck converter is implemented using a switching transistor having a drain coupled to a power input rail via a first transistor. The load of the buck converter is coupled to the source of the switching transistor via a series resistor and a series inductor such that the buck converter. Because the series resistor is coupled in series with the load, the buck converter is able to continually monitor the output current of the converter by measuring the voltage across the series resistor. Based on these measurements of the voltage across the series resistor, the buck converter controls the average current delivered to the load by turning on and off the switching transistor. Power is provided to the circuits that monitors the load current and controls the switching transistor via a power rail that is coupled between a gate of the first transistor and a floating reference node coupled to the series resistor and the series inductor. A decoupling capacitor coupled between the gate of the first transistor and the floating reference node smoothes the voltage of the power rail, as well as maintains the gate voltage of the first transistor.

Figure 1A:
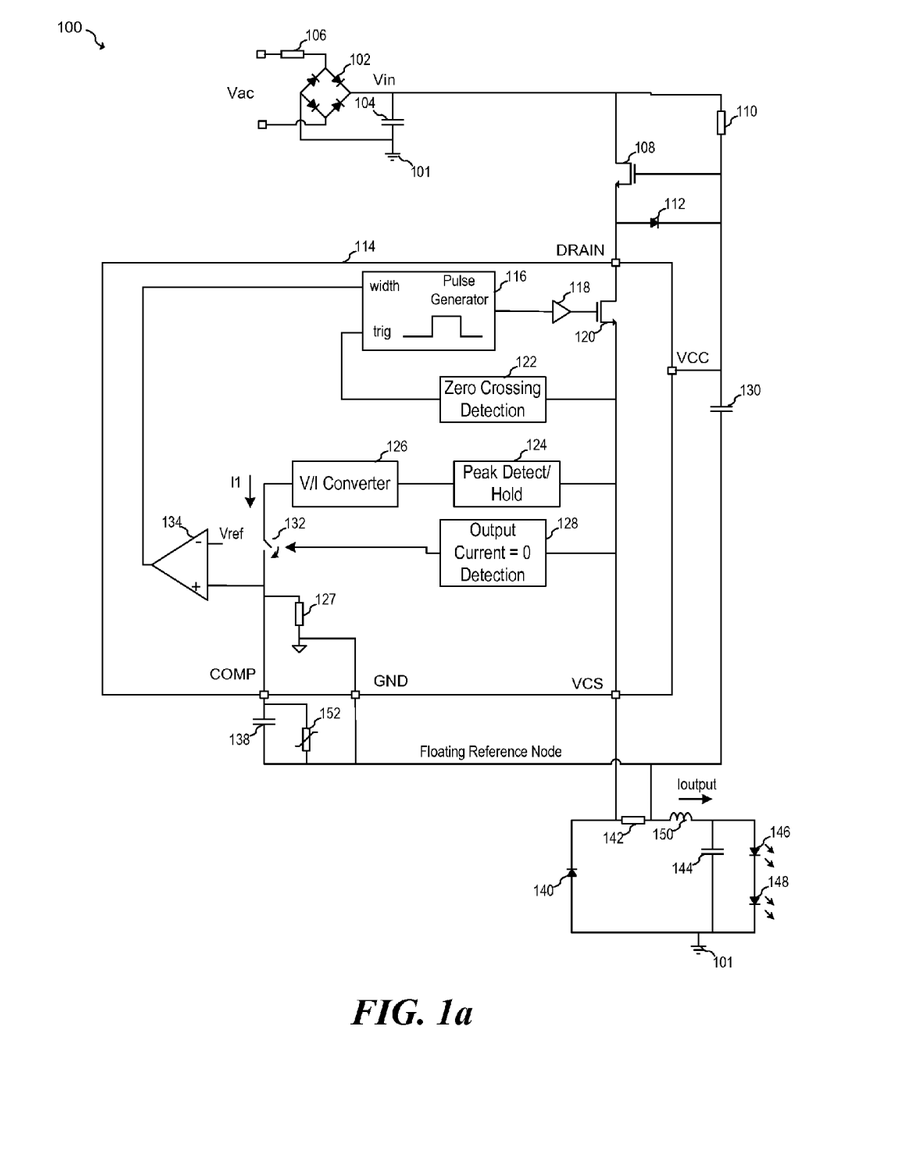
FIGS. 1a-b illustrate a schematic diagram of an embodiment switched-mode buck converter and associated waveform diagrams.

FIG. 1a illustrates an embodiment switched-mode buck converter 100 that includes controller circuit 114 coupled to input node Vin via transistor 108 and coupled to a load represented by light emitting diodes (LEDs) 146 and 148. Diode bridge rectifier 102 converts AC voltage Vac, which may represent, for example, an AC mains voltage, to DC voltage Vin coupled to transistor 108. Resistor 106 may be used to limit inrush current and resistor 110 may be used to charge VCC capacitor 130 when switched-mode buck converter 100 is first connected to the AC power source, and input filter capacitor 104 filters voltage ripple on node Vin. The switching action of switching transistor 120 provides current to the load represented by LEDs 146 to 148 by magnetizing series inductor 150 via series resistor 142, thereby transferring power from the input port to the load. In embodiments, switching transistor 120 and transistor 108 may be implemented using transistors such as metal oxide semiconductor field-effect transistors (MOSFET), insulated gate bipolar transistors (IGBT), power MOSFETs, or the like. In some embodiments, transistor 108 is implemented using a device that is able to withstand high drain-source and high gate-drain voltages. For example, during operation, the drain-source voltage of transistor may exceed 500 V depending on the AC mains voltage.

In an embodiment, controller circuit 114 is "floating" with respect to the ground reference 101 to which the rectified input voltage Vin is referenced. In an embodiment, power is supplied to controller circuit 114 via transistor 108 whose gate is biased via bias resistor 110 and power supply capacitor 130. The ground connection GND of controller circuit 114 is referenced to a floating reference node coupled to a common node between series resistor 142 and series inductor 150. Power supply capacitor 130 provides a stable voltage for power supply pin VCC with respect to the floating reference node. During startup, bias resistor 110 charges power supply capacitor 130 to the point at which controller circuit 114 starts operating. Next, during switching, the parasitic drain-source capacitance of transistor 108 acts a charge pump to charge power supply capacitor 130 and supply power pin VCC of controller circuit 114. In addition, diode 112 and transistor 108 clamps the VCC voltage. During operation, power supply capacitor 130 is discharged by the operation current within controller circuit 114. In some embodiments, controller circuit 114 includes a clamping circuit (not shown) that keeps the VCC voltage below a certain maximum voltage. This maximum voltage may be, for example, 12 V. Alternatively, other maximum voltages may be used depending on the particular embodiment, its specifications, and the particular IC technology used to implement controller circuit 114.

During operation, output current Ioutput continuously flows through series resistor 142. When switching transistor 120 is turned on, current Ioutput flows through the load path of switching transistor 120, through series resistor 142 and series inductor 150 and through the load represented by LEDs 146 and 148. Output capacitor 144 may be used to reduce voltage ripple at the load. As switching transistor 120 is turn on, current through series inductor 150 linearly increases. When switching transistor 120 is turned off, current continues to flow through series resistor 142, series inductor 150 and the load represented by LEDs 146 and 148, however, the current is sourced by diode 140 instead of switching transistor 120 as series inductor 150 is demagnetized. Because Ioutput continuously flows through series resistor 142, controller circuit 114 may be configured to continuously monitor Ioutput in order to control Ioutput to a predetermined current.

In an embodiment, controller circuit 114 monitors Ioutput via pin VCS coupled to the source of switching transistor 120. An average output current is determined by monitoring the voltage of pin VCS, and hence, the voltage across series resistor 142 that represents output current Ioutput. In one example, peak detection and hold circuit 124 determines a peak voltage of pin VCS that represents a maximum output current. Next, the output of peak detection and hold circuit 124 is converted to a current I1 via voltage to current converter 126. Current I1 charges comparison capacitor 138 at the same time that comparison capacitor 138 is being discharged by the parallel combination of discharge resistor 127 and PTC resistor 152. The voltage across comparison capacitor 138 is compared to reference voltage Vref using comparator 134, the output of which adjusts a pulse width of pulse generator 116 that determines the on-time of switching transistor 120. The output of comparator 134 is effectively an error signal and voltage Vref is proportional to the target value of Ioutput. In one embodiment, the target output current Ioutput$_{TG}$ is set to:

$$Ioutput_{TG} = \frac{Vref}{g_{VI}R_{CS}R_{DIS}}, \quad (1)$$

where $g_{VI}$ is the transconductance of voltage to current converter 126, $R_{CS}$ is the resistance of series resistor 142, and $R_{DIS}$ is the resistance of a parallel combination of discharge resistor 127 and PTC resistor 152. It should be appreciated that in some embodiments, peak detection and hold circuit 124 may be omitted and the input to voltage to current converter may be connected directly to the source of switching transistor 120 at pin VCS.

During operation, when the difference between the voltage at pin VCS and the floating reference node is zero, switching transistor 120 is turned on by triggering pulse generator 116 with zero crossing detector 122. This condition indicates that output current Ioutput is zero since the voltage across series resistor 142 is zero volts. Alternatively, zero crossing detector 122 may by be triggered at some other voltage difference besides a zero voltage difference between the voltage at pin VCS and the floating reference node. In an embodiment, pulse generator 116 produces a predetermined pulse width that activates switching transistor 120. This predetermined pulse width may be increased and decreased based on the state of the output of comparator 134. For example, if the output of comparator 134 is high, which signifies that output Ioutput is above the target level, the width of the pulse produced by the pulse generator is reduced, thereby reducing the time during which series inductor 150 is magnetized. On the other hand, if the output of comparator is low, which signifies that output current Ioutput is below the target level, the width of the pulse produced by the pulse generator is increased, thereby increasing the time during which series inductor 150 is magnetized.

In an embodiment, gate driver 118 includes the requisite circuitry to drive switching transistor 120. This circuitry may include, for example, gate driver circuits as known in the art. In some embodiments, switching transistor 120 and/or gate driver 118 may reside on the same integrated circuit as the other components of controller circuit 114. Alternatively switching transistor 120 and/or gate driver 118 may be separate from controller circuit 114.

In some embodiments, output current detector 128 detects a zero current condition by monitoring the source of switching transistor 120 at node VCS. When such a condition is detected, switch 132 coupled between the output of voltage to current converter 126 and comparison capacitor 138 is opened. By opening switch 132 when inductor 150 is not conducting current, errors due to delays in turning on switching transistor 120 and delays in detecting the zero crossing of the voltage at pin VCS may be compensated. Moreover, by opening switch 132 after series inductor 150 has been demagnetized, accurate current control may be maintained when switched-mode buck converter 100 is operating in a discontinuous conduction mode (DCM).

In some embodiments, a positive temperature coefficient (PTC) resistor is coupled in parallel to comparison capacitor 138 for thermal protection. In one embodiment, when the temperature of the printed circuit board (PCB) on which switched-mode buck converter 100 is disposed exceeds a threshold temperature, the average output current may be reduced.

Figure 1B:
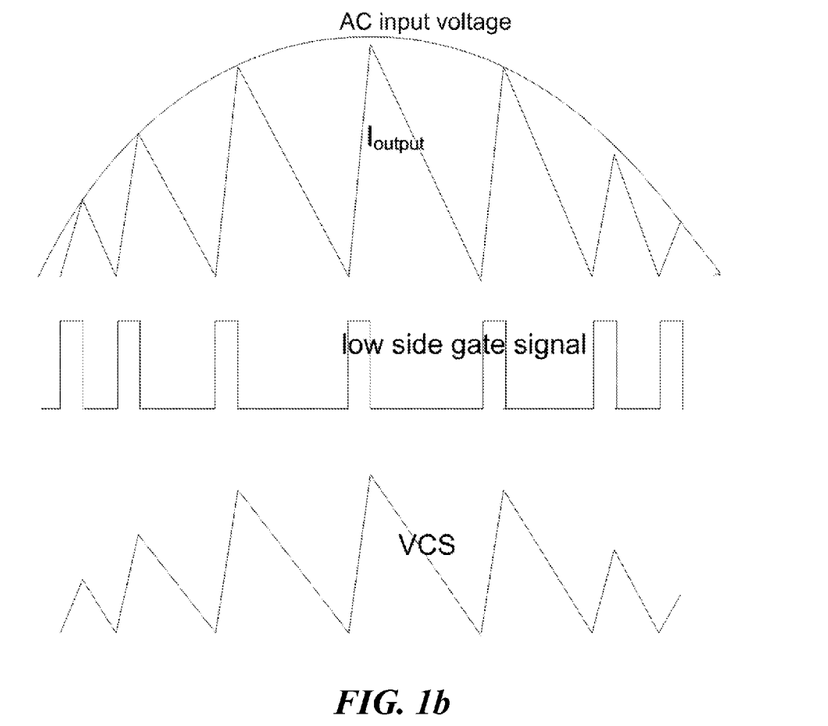

FIG. 1b illustrates a waveform diagram showing the operation of switched-mode buck converter 100. As shown, when the low side gate signal representing the gate voltage of switching transistor 120 is high, output current Ioutput linearly increases due the magnetization of the series inductor 150 and the voltage VCS at pin VCS increases accordingly. On the other hand, when the low side gate signal representing the gate voltage of switching transistor 120 is low, output current Ioutput linearly decreases due the magnetization of the series inductor 150 and the voltage VCS at pin VCS decreases accordingly. As shown, the magnitude of the peaks of output current Ioutput may follow an envelope of the AC input voltage cases where voltage Vin is sinusoidal when input filter capacitor 104 is small.

Figure 2:
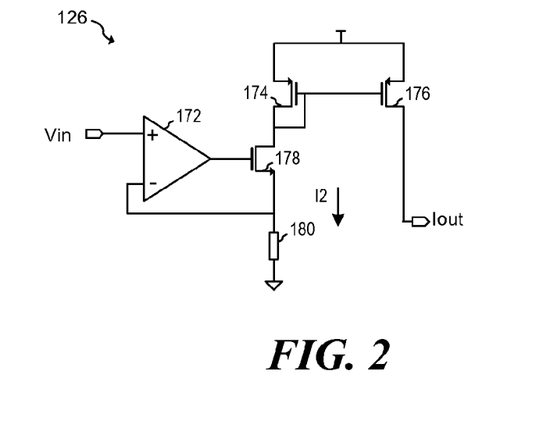
FIG. 2 illustrates a schematic of an embodiment voltage to current converter circuit.

FIG. 2 illustrates a schematic of an example circuit that may be used to implement voltage to current converter 126 shown in FIG. 1*a*. In an embodiment, voltage to current converter 126 converts input voltage Vin to current I2 using operational amplifier 172, NMOS transistor 178 and resistor 180. Operational amplifier 172, that output of which is coupled to the gate of NMOS transistor 178 forces the voltage of the source terminal of NMOS transistor 178 to be at about Vin by forcing the difference between the positive and negative terminals of Operational Amplifier 172 to be about zero volts. As such, the voltage across resistor 180 is about Vin and the current I2 through resistor 180 is about Vin/$R_{180}$. Current I2 is mirrored to current Iout via a current mirror made of PMOS transistors 174 and 176. It should be appreciated that the circuit of FIG. 2 is just one of many examples of embodiment voltage to current converters that may be used to implement the functionality of voltage to current converter 126. In alternative embodiments, other voltage to current converters known in the art may be used.

In an embodiment, voltage to current converter 126 has a transconductance $$g_{VI} = \frac{m}{R_{180}},$$

where m is the minor ratio of the current minor formed by NMOS transistors 174 and 176 and $R_{180}$ is the resistance of resistor 180. This expression for $g_{VI}$ may be used in equation (1) above to determine target output current Ioutput$_{TG}$.

Figure 3:
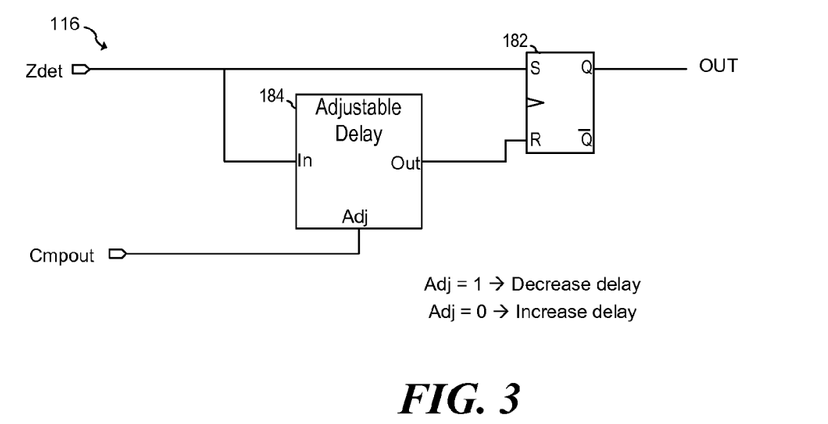
FIG. 3 illustrates a schematic of an embodiment pulse generator circuit.

FIG. 3 illustrates a schematic of an example circuit that may be used to implement pulse generator 116 shown in FIG. 1*a*. In an embodiment, pulse generator 116 includes SR latch 182 and adjustable delay circuit 184. When signal Zdet coupled to the output of zero crossing detector 122 is activated, the SR latch 182 is set via set pin S, thereby causing the output OUT to go high. After a predetermined time period determined by adjustable delay 184, the reset pin R of SR latch 182 is activated, thereby causing the output OUT of SR latch 182 to go low. The output of comparator 134 is coupled to the adjust pin of adjustable delay 184 and increases or decreases the delay produced by adjustable delay 184.

In some embodiments, adjustable delay 184 may be implemented using a timing capacitor and a current source. In such an embodiment, the delay may be adjusted by adjusting the charging current and/or the size of the timing capacitor. Alternatively, a counter may be used to implement the delay of adjustable delay 184. Such a delay may be adjusted, for example, by changing the initial value of the counter and/or the terminal count of the counter. In the illustrated example of FIG. 3, the length of the delay produced by pulse generator 116 may be increased when the adjustment pin Adj is high and decreased when the adjustment pin Adj is low. It should be appreciated that in further embodiments, other circuits and methods known in the art may be used to produce a pulse of an adjustable pulse width.

Figure 4:
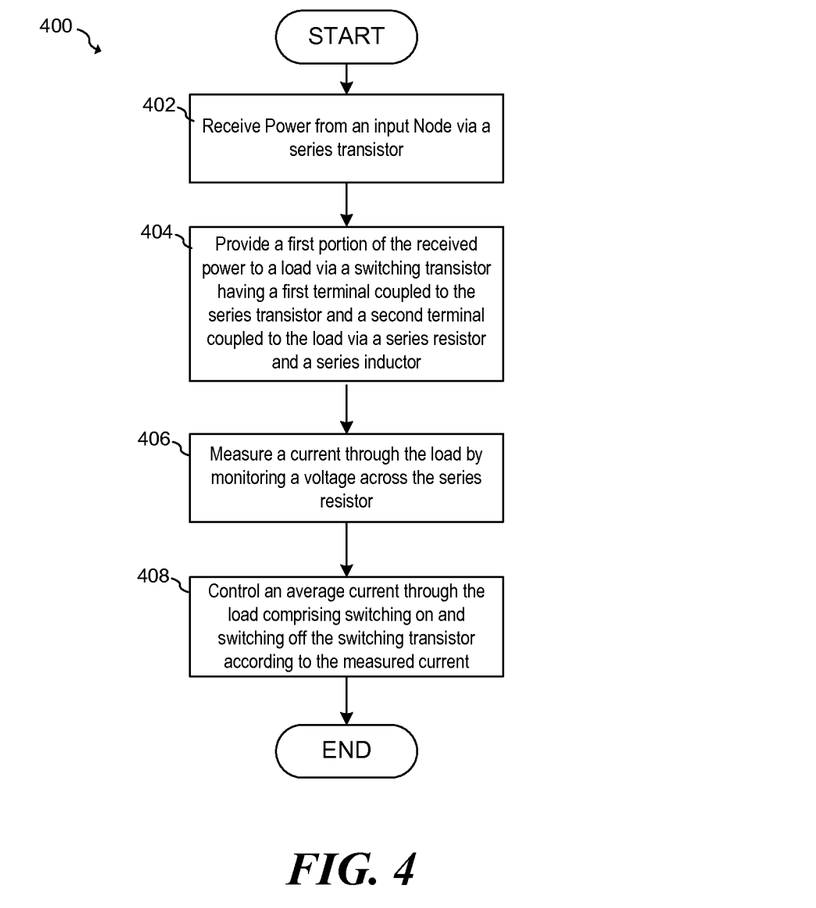
FIG. 4 illustrates a flowchart of an embodiment method.

FIG. 4 illustrates a flowchart of an embodiment method 400. In step 402, power is received from an input node via a first transistor. The input node may be an output of a diode bridge rectifier, as shown in FIG. 1*a*, or the input node may be a DC voltage. In step 404, a first portion of the received power is provided to a load via a switching transistor having a first terminal coupled to the transistor and a second terminal coupled to the load via a series resistor and a series inductor.

In some embodiments, the first terminal may be a drain of a MOSFET and the second terminal may be a source of a MOSFET. The load may be, for example, one or more LEDs. In step 406, a current through the load is measured by monitoring a voltage across the series resistor, and on step 408, an average current through the load is controlled by switching on and switching off the switching transistor according to the measured current.

In accordance with an embodiment, a method of operating a switched-mode power supply includes receiving power from an input node via a first transistor, providing a first portion of the received power to a load via a switching transistor having a first terminal coupled to the first transistor and a second terminal coupled to the load via a series resistor and a series inductor, measuring a current through the load, measuring comprising monitoring a voltage across the series resistor; and controlling an average current through the load by switching on and switching off the switching transistor according to the measured current. The series resistor, the series inductor and the load may be coupled in series with each other. Providing the first portion of the received power to the load may include supplying power to a light emitting diode (LED) coupled to the series inductor.

In an embodiment, the method further includes providing a second portion of the received power to a controller circuit via a power supply node electrically coupled to a gate of the first transistor and a supply capacitor coupled to a floating reference node coupled between the series resistor and the series inductor. Providing the second portion of the received power may include charging the supply capacitor with a supply resistor coupled between the input node and the supply capacitor.

In an embodiment, monitoring a voltage across the series resistor includes converting the voltage across the series resistor to a first current using a voltage to current converter, charging a comparison capacitor with the first current, wherein the comparison capacitor is coupled between an output of the voltage to current converter and a floating reference node coupled between the series resistor and the series inductor, and comparing a voltage across the comparison capacitor with a first reference voltage. Monitoring the voltage further may further include performing a peak detection on the voltage across the series resistor before converting the voltage across the series resistor to a first current.

In an embodiment, controlling the average current includes turning on the switching transistor when the voltage across the series resistor crosses a first threshold voltage, turning off the switching transistor a first time period after turning on the switching transistor, and modifying the first time period based on the measuring the current through the load. The first threshold voltage may include a voltage at a reference node coupled between the series resistor and the series inductor. Moreover, modifying the first time period may include increasing the first time period when the average current is below a current threshold, and decreasing the first time period when the average current is above a threshold.

In accordance with a further embodiment, a switched-mode power supply includes a first switching transistor having a first terminal configured to be coupled to an input node via a first transistor and a second terminal configured to be coupled to a load via a series resistor and an inductor; a load current monitoring circuit having an input coupled to the second terminal of the switching transistor; and a switch timing circuit having an input coupled to the load current monitoring circuit and an output coupled to the first switching transistor, the switch timing circuit configured to control an average current through the load based on an output of the load current monitoring circuit. The load current monitoring circuit is configured to monitor the current through the load by monitoring a voltage across the series resistor. In an embodiment, the switched-mode power supply further includes a switch timing circuit having an input coupled to the load current monitoring circuit and an output coupled to the first switching transistor. The switch timing circuit is configured to control an average current through the load based on an output of the load current monitoring circuit. The load may include, for example, a light emitting diode (LED). In an embodiment, the first switching transistor, load current monitoring circuit and the switch timing circuit may be disposed on an integrated circuit.

In an embodiment, the switched-mode power further includes the first transistor, the series resistor and the series inductor. The series resistor, the series inductor and the load may be coupled in series with each other.

In an embodiment, the load current monitoring circuit is configured to receive power from power supply rails coupled between a gate of the first transistor and a floating reference node coupled between the series resistor and the series inductor. The switched-mode power may further include a peak-detector coupled between the second terminal of the switching transistor and the input of the load monitoring circuit.

In an embodiment, the load current monitoring circuit includes a voltage to current converter having an input coupled to the second terminal of the switching transistor, a comparison capacitor having a first terminal coupled to an output of the voltage to current converter and a second terminal coupled to a floating reference node coupled between the series resistor and the series inductor, a discharge resistor coupled between the first terminal of the comparison capacitor and the floating reference node, and a comparator having a first input coupled to the terminal of the comparison capacitor and a second input coupled to a reference voltage.

The switched-mode power supply may further include an output current detection circuit coupled to the second terminal of the switching transistor, and a switch that includes a load path coupled between the output of the voltage to current converter and the first terminal of the comparison capacitor, and a control terminal coupled to an output of the output current detection circuit, such that the output current detection circuit is configured to open the switch when the output current detection circuit determines that the load current is zero.

In an embodiment, the switched-mode power supply further includes a threshold detector having an input coupled to the second terminal of the switching transistor and an output coupled to the switch timing circuit. The threshold detector is configured to determine when a voltage at the second terminal of the switching transistor crosses a first threshold. The switch timing circuit may be configured to generate a pulse of a first duration when threshold detector determines that a voltage at the second terminal of the switching transistor crosses the first threshold, and modify the first duration based on an output of the load current monitoring circuit.

In an embodiment, the switch timing circuit is configured to modify the first duration by increasing the first during when the load current monitoring circuit determines that an average current is below a current threshold, and decreasing the first duration when the load current monitoring circuit determines that the average current is above a current threshold.

In accordance with a further embodiment, a switched-mode power supply circuit includes, a first transistor having a drain coupled to an input node of the switched-mode power supply, a resistor coupled between a gate of the first transistor and the input node, a switching transistor having a drain coupled to a source of the first transistor, a series resistor having a first terminal coupled to a source of the switching transistor, a series inductor having a first terminal coupled a second terminal of the series resistor at a floating referenced node and a second terminal configured to be coupled to a load, a supply decoupling capacitor having a first terminal coupled to a gate of the first transistor and a second terminal coupled to the floating reference node, and controller circuitry. The controller circuitry has an output coupled to a gate of the switching transistor, a first power terminal coupled to the first terminal of the supply decoupling capacitor, and a second power terminal coupled to the floating reference node. The controller circuitry is configured to receive power from the first and second power terminals.

In an embodiment, the controller circuitry is configured to continuously measure a current to the load by monitoring a voltage between the source of the switching transistor and the floating reference node, produce an error signal based on the monitored voltage, and control an average current to the load by switching on and switching off the switching transistor. In some embodiments, the load may include a light emitting diode (LED).

Advantages of some embodiments include the ability to control a current through a load based on monitoring the current over an entire conversion cycle. This is because the series current measurement resistor used by some embodiment controllers always has the load current flowing directly through it both when the inductor is being magnetized and when the inductor is being demagnetized. A further advantage is the ability to detect the demagnetization of the inductor without the need to perform valley detection (through low side transistor drain voltage, and it directly detect valley of VCS), thereby allowing for the use of topologically simple circuits, such as a comparator, to detect the demagnetization of the inductor.

A further advantage of embodiments that use a transistor and a supply decoupling capacitor coupled between the power supply pin of the controller and the floating reference node is the ability to bias and bypass the power supply of the controller using a single decoupling capacitor. Moreover, in some embodiments, external zener diodes are not necessary.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a switched-mode power supply, the method comprising:
   receiving power from an input node via a first transistor;
   providing a first portion of the received power to a load via a switching transistor having a first terminal coupled to the first transistor and a second terminal coupled to the load via a series resistor and a series inductor;
   measuring a current through the load, measuring comprising monitoring a voltage across the series resistor using a measurement circuit coupled between the second terminal and a floating reference node connected between the series resistor and the series inductor; and
   controlling an average current through the load comprising switching on and switching off the switching transistor according to the measured current.

2. The method of claim 1, wherein the series resistor, the series inductor and the load are coupled in series with each other.

3. The method of claim 1, further comprising providing a second portion of the received power to a controller circuit via a power supply node electrically coupled to a gate of the first transistor and a supply capacitor coupled to the floating reference node.

4. The method of claim 3, where providing the second portion of the received power comprises charging the supply capacitor with a supply resistor coupled between the input node and the supply capacitor.

5. The method of claim 1, wherein monitoring the voltage across the series resistor comprises:
converting the voltage across the series resistor to a first current using a voltage to current converter;
charging a comparison capacitor with the first current, wherein the comparison capacitor is coupled between an output of the voltage to current converter and the floating reference node; and
comparing a voltage across the comparison capacitor with a first reference voltage.

6. The method of claim 5, wherein monitoring the voltage further comprises performing a peak detection on the voltage across the series resistor before converting the voltage across the series resistor to a first current.

7. A method of operating a switched-mode power supply, the method comprising:
receiving power from an input node via a first transistor;
providing a first portion of the received power to a load via a switching transistor having a first terminal coupled to the first transistor and a second terminal coupled to the load via a series resistor and a series inductor;
measuring a current through the load, measuring comprising monitoring a voltage across the series resistor; and
controlling an average current through the load comprising switching on and switching off the switching transistor according to the measured current, wherein controlling the average current comprises
turning on the switching transistor when the voltage across the series resistor crosses a first threshold voltage;
turning off the switching transistor a first time period after turning on the switching transistor; and
modifying the first time period based on the measuring the current through the load.

8. The method of claim 7, wherein the first threshold voltage comprises a voltage at a reference node coupled between the series resistor and the series inductor.

9. The method of claim 7, wherein modifying the first time period comprises:
increasing the first time period when the average current is below a current threshold; and
decreasing the first time period when the average current is above a threshold.

10. The method of claim 1, wherein providing the first portion of the received power to the load comprises supplying power to a light emitting diode (LED) coupled to the series inductor.

11. A switched-mode power supply comprising:
a first switching transistor having a first terminal configured to be coupled to an input node via a first transistor and a second terminal configured to be coupled to a load via a series resistor and a series inductor;
a load current monitoring circuit having a first input terminal coupled to the second terminal of the first switching transistor and a floating reference terminal configured to be coupled to a floating reference node between the series resistor and the series inductor, the load current monitoring circuit configured to monitor a current through the load by monitoring a voltage across the series resistor; and
a switch timing circuit having an input coupled to the load current monitoring circuit and an output coupled to the first switching transistor, the switch timing circuit configured to control an average current through the load based on an output of the load current monitoring circuit.

12. The switched-mode power supply of claim 11, further comprising the first transistor, the series resistor and the series inductor.

13. The switched-mode power supply of claim 12, wherein the series resistor, the series inductor and the load are coupled in series with each other.

14. The switched-mode power supply of claim 11, wherein the load current monitoring circuit is configured to receive power from power supply rails coupled between a gate of the first transistor and the floating reference terminal of the load current monitoring circuit.

15. The switched-mode power supply of claim 11, further comprising a peak-detector coupled between the second terminal of the first switching transistor and the first input terminal of the load current monitoring circuit.

16. The switched-mode power supply of claim 11, wherein the load current monitoring circuit comprises:
a voltage to current converter having an input coupled to the first input terminal of the load current monitoring circuit;
a comparison capacitor comprising a first terminal coupled to an output of the voltage to current converter and a second terminal coupled to the floating reference terminal; and
a comparator having a first input coupled to the first terminal of the comparison capacitor and a second input coupled to a reference voltage.

17. The switched-mode power supply of claim 16, further comprising:
an output current detection circuit coupled to the second terminal of the first switching transistor; and
a switch comprising a load path coupled between the output of the voltage to current converter and the first terminal of the comparison capacitor, and a control terminal coupled to an output of the output current detection circuit, wherein the output current detection circuit is configured to open the switch when the output current detection circuit determines that the current through the load is zero.

18. The switched-mode power supply of claim 16, further comprising a threshold detector having an input coupled to the second terminal of the first switching transistor and an output coupled to the switch timing circuit, wherein the threshold detector is configured to determine when a voltage at the second terminal of the first switching transistor crosses a first threshold.

19. The switched-mode power supply of claim 18, wherein the switch timing circuit is configured to:
generate a pulse of a first duration when the threshold detector determines that a voltage at the second terminal of the first switching transistor crosses the first threshold; and
modify the first duration based on an output of the load current monitoring circuit.

20. The switched-mode power supply of claim 19, wherein the switch timing circuit is configured to modify the first duration by increasing the first duration when the load current monitoring circuit determines that an average current is below a current threshold and decreasing the first duration when the load current monitoring circuit determines that the average current is above a current threshold.

21. The switched-mode power supply of claim 11, wherein the load comprises a light emitting diode (LED).

22. The switched-mode power supply of claim 11, wherein the first switching transistor, load current monitoring circuit and the switch timing circuit are disposed on an integrated circuit.

23. A switched-mode power supply circuit comprising;
a first transistor having a drain coupled to an input node of the switched-mode power supply circuit;
a resistor coupled between a gate of the first transistor and the input node;
a switching transistor having a drain coupled to a source of the first transistor;
a series resistor having a first terminal coupled to a source of the switching transistor;
a series inductor having a first terminal coupled a second terminal of the series resistor at a floating reference node and a second terminal configured to be coupled to a load;
a supply decoupling capacitor having a first terminal coupled to a gate of the first transistor and a second terminal coupled to the floating reference node; and
controller circuitry having an output coupled to a gate of the switching transistor, a first power terminal coupled to the first terminal of the supply decoupling capacitor, and a second power terminal coupled to the floating reference node, wherein the controller circuitry is configured to receive power from the first and second power terminals.

24. The switched-mode power supply circuit of claim 23, wherein the controller circuitry is configured to:
continuously measure a current to the load by monitoring a voltage between the source of the switching transistor and the floating reference node; and
produce an error signal based on the monitored voltage; and
control an average current to the load by switching on and switching off the switching transistor.

25. The switched-mode power supply circuit of claim 23, wherein the load comprises a light emitting diode (LED).

26. The method of claim 1, further comprising capacitively coupling the floating reference node to a gate of the first transistor.

27. The switched-mode power supply of claim 16, wherein the load current monitoring circuit further comprises a discharge resistor coupled between the first terminal of the comparison capacitor and the floating reference terminal.

* * * * *